(12) United States Patent
Beierl et al.

(10) Patent No.: US 7,631,923 B2
(45) Date of Patent: Dec. 15, 2009

(54) TOP FOR A CONVERTIBLE

(75) Inventors: Dominik Beierl, Korntal-Münchingen (DE); Felix Hermann, Leonberg (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 266 days.

(21) Appl. No.: 11/852,424

(22) Filed: Sep. 10, 2007

(65) Prior Publication Data

US 2008/0061582 A1    Mar. 13, 2008

(30) Foreign Application Priority Data

Sep. 8, 2006   (DE) ....................... 10 2006 042 259

(51) Int. Cl.
*B60J 7/12* (2006.01)

(52) U.S. Cl. .................. 296/116; 296/135; 296/213

(58) Field of Classification Search ............. 296/107.4, 296/116, 135, 213
See application file for complete search history.

(56) References Cited

U.S. PATENT DOCUMENTS 5,669,656 A    9/1997   Aydt et al.
6,030,022 A *  2/2000   Bormann et al. ....... 296/107.04

FOREIGN PATENT DOCUMENTS

EP          0713794 B1    5/1996

\* cited by examiner

*Primary Examiner*—Lori L Lyjak

(57) ABSTRACT

A top for a convertible has a top linkage forming a lateral roof frame at each side, and a flexible covering which is stretched open when the top is closed and covers at least parts of the top. When the top is closed, a seal is disposed between a stiffened region of the stretched-open covering, which region faces the associated lateral roof frame, and the associated lateral roof frame.

13 Claims, 2 Drawing Sheets

TOP FOR A CONVERTIBLE

CROSS-REFERENCE TO RELATED APPLICATION

This application claims the priority, under 35 U.S.C. §119, of German application DE 10 2006 042 259.7, filed Sep. 8, 2006; the prior application is herewith incorporated by reference in its entirety.

BACKGROUND OF THE INVENTION

Field of the Invention

The present invention relates to a top for a convertible, which can be put in a rear region of the convertible. The top has at each side a top linkage forming a lateral roof frame and a flexible covering which is stretched open when the top is closed and covers at least parts of the top.

Convertibles usually have openable roofs, generally "hard tops" or "soft tops". In both variants, seals which are provided between the top and a top linkage of the rest of the convertible, constitute potential weak points. Since, in the event of a reduced sealing action of the seals, in addition to an unpleasant draft also admission of road noise into a vehicle interior can significantly impair the driving comfort of the convertible, it is particularly important to configure the seals in such a manner that, first, they form a reliable and tight seal and, second, the sealing function is maintained over the long-term.

European patent EP 0 713 794 B1, corresponding to U.S. Pat. No. 5,669,656, discloses a folding top for vehicles, which is composed of a top framework and a top cloth. The top cloth and sealing strips are held in position on lateral frame parts of the top framework, with connections with the top cloth and the sealing strips being provided separately from one another on the lateral frame parts of the top framework. This spatial separation of the fastenings for the top cloth, on the one hand, and the sealing strips, on the other hand, is intended to make it easier to exchange a damaged top cloth, since only the sealing strips have to be removed from correspondingly associated retaining rails.

BRIEF SUMMARY OF THE INVENTION

It is accordingly an object of the invention to provide a top for a convertible which overcomes the above-mentioned disadvantages of the prior art devices of this general type, which is improved or at least a different embodiment which, by use of a better sealing action of the seals disposed on the top, increases the traveling comfort of the convertible.

With the foregoing and other objects in view there is provided, in accordance with the invention, a top for a convertible which can be put away in a rear region of the convertible. The top contains top linkages each forming a lateral roof frame with one of the top linkages disposed on each side of the convertible. A flexible covering stretches open when the top is closed and covers at least parts of the top, the flexible covering having stiffened lateral regions facing the lateral roof frame. A seal is disposed between the stiffened lateral regions of the flexible covering and the lateral roof frame when the top is closed forming a stretched-open covering.

The invention is based on the general concept, in the case of a top with a top linkage forming a lateral roof frame and a flexible covering which can be stretched open, of stiffening lateral regions of the flexible covering and of providing a seal between these stiffened regions and the top linkage forming the lateral roof frame. This enables a predefined and predeterminable sealing action to be obtained, since the seal is now disposed between two stiff regions, namely the stiffened region on the covering and the lateral roof frame, and, as a result, in comparison to conventional convertibles which are not stiffened in the region of the flexible covering, permit better and thereby tight bearing of the seal against the covering. In this case, the stiffened lateral regions of the covering face the respectively associated lateral roof frame. This new type of sealing affords the advantage of being able to seal defined and stiffened sealing regions by a seal lying in-between and, as a result, of being able to increase the sealing action in comparison to a conventional top with lateral regions which are not stiffened.

The top expediently has clamping elements stretching open the covering in a sheet-like manner and stiffening it. Sheet-like clamping elements of this type can be configured, for example, in the manner of an integral roof frame and/or in the manner of "surface bows" and, when the top is closed, can force the covering, which is flexible per se, into a consistently identical roof outer contour. At the same time, the top can be of stiffer design per se by use of such clamping elements, as a result of which, in particular the soundproofing in the interior of the convertible is improved.

In an advantageous development of the solution according to the invention, the seal has at least one sealing lip which faces the stiffened lateral region of the covering. As is generally known, sealing lips of this type are flexible and, when the top is closed, are placed in a sealing manner against the stiffened lateral region of the covering. If, for example, a plurality of sealing lips are now provided, the sealing action can thus be improved in a structurally very simple manner.

In a further advantageous embodiment of the solution according to the invention, the seal has at least one chamber which increases the elasticity thereof. A chamber of this type constitutes a type of cavity which weakens a cross section of the seal in the region of the chamber and, as a result, allows the seal to become more flexible in this region. At the same time, a saving on weight can also be obtained thereby, which is of significance in particular in the region of construction of sports cars. However, of prime importance is that the elasticity is to be increased with a chamber of this type, as a result of which, in general, the sealing action of the seal is improved.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a top for a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
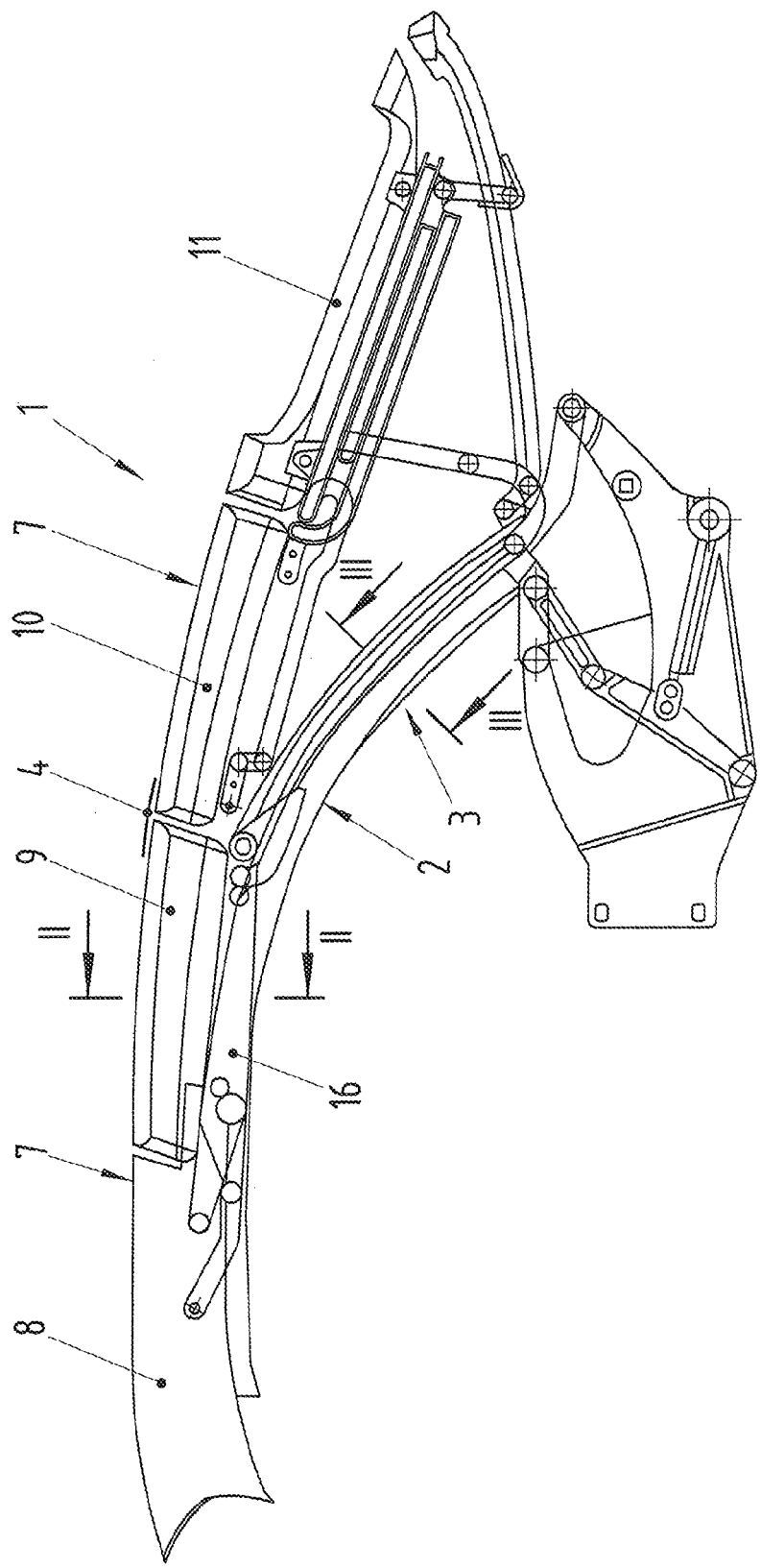
FIG. 1 is a diagrammatic, side view of a top according to the invention in a region of a lateral roof frame.

With regards to the drawing, the same reference numbers throughout the drawing refer to identical or similar or functionally identical components. Referring now to the figures of the drawing in detail and first, particularly, to FIGS. 1-3 thereof, there is shown a top 1, which can be opened (lowered), of a non-illustrated convertible, and which can be put away in a rear region of the convertible, in particular in a non-illustrated top compartment. The top 1 has at least the following components: a top linkage 3 which forms a lateral roof frame 2 and is disposed in each case laterally on the top 1, and a covering 4 which at least partially covers the top 1. In this case, the laterally disposed top linkage 3 is configured as a driving linkage and, upon pivoting of the same, brings about an opening kinematics which is specific to the top 1 according to the invention and which is explained in more detail below. In general, when the top 1 is closed (fully raised), the covering 4 forms a continuous roof contour and is preferably of water-repelling and, in particular, sound-damping construction, as a result of which an interior of the convertible can be shielded from road noise and external weather effects.

Figure 2:
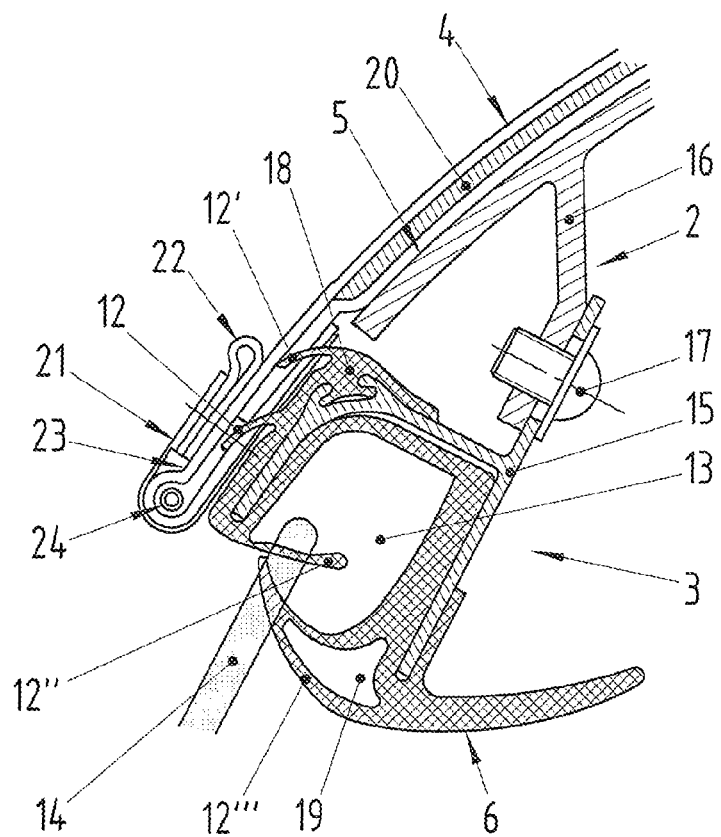
FIG. 2 is a sectional view taken along the line II-II shown in FIG. 1.
Figure 3:
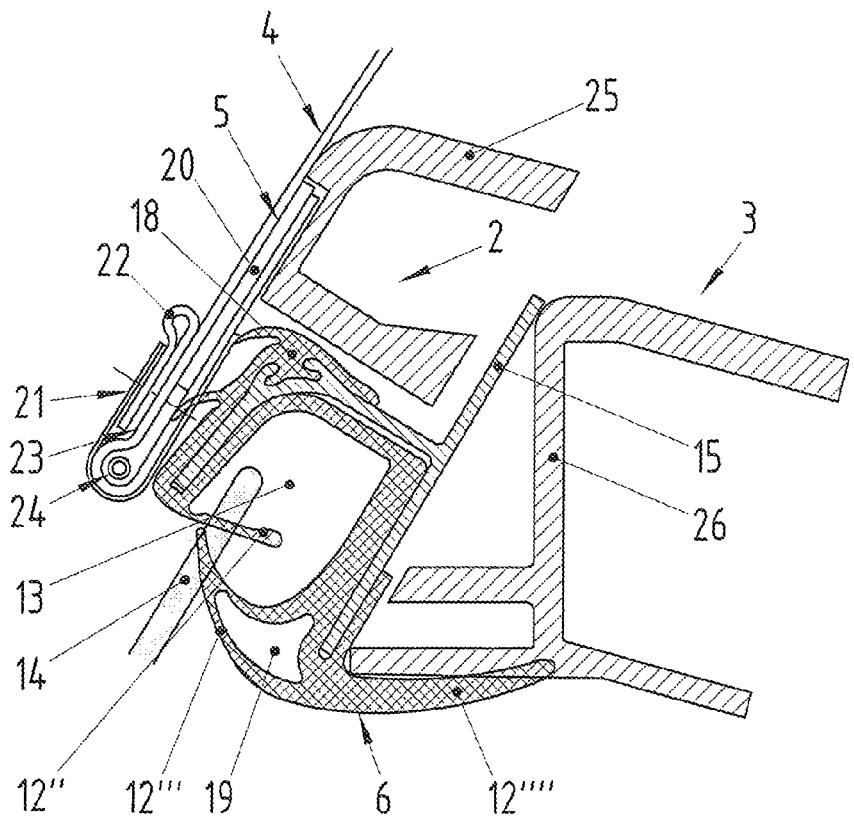
FIG. 3 is a sectional view taken along the line III-III shown in FIG. 1.

According to the invention, the covering 4 of the top 1 now has stiffened lateral regions 5 which face the associated lateral roof frame 2 (see FIGS. 2 and 3). According to the invention, a seal 6 is now disposed between the stiffened regions 5 of the covering 4, which is stretched open when the top is closed, and the associated lateral roof frame 2, i.e. the top linkage 3, which seal 6 is likewise intended to shield the convertible interior from noise pollution prevailing outside the convertible and, further, is intended to keep the relative wind, i.e. draft, away from the convertible interior, in particular during operation of the convertible.

As can be seen in FIG. 1, the top 1 has clamping elements 7 stretching open the covering 4 in a sheet-like manner and at the same time stiffening it, the top 1 according to FIG. 1 having a total of four clamping elements 7 stretching open the covering 4 in a sheet-like manner. In this case, the frontmost clamping element 7 in the direction of travel is configured as an integral roof frame 8 while the clamping elements 7 placed directly behind it are configured as a first surface bow 9 and a second surface bow 10. The clamping elements 7 adjoining behind the second surface bow 10 in the direction of travel is configured as a rear window frame 11 with a receptacle for a rear window. If the top 1 is opened, then the integral roof frame 8 and the first surface bow 9 are located above the rear window frame 11 while the second surface bow 10 is put away below the rear window frame 11. This manner of stacking the individual clamping elements 7 one above another when the top 1 is put away permits an advantageous package effect and, as a result, a construction-space-minimizing storage position of the top 1.

According to FIGS. 2 and 3, the seal 6 has at least one, here in each case two, sealing lips 12, 12' which face the stiffened lateral region 5 of the covering 4. The sealing lips 12, 12' here are shown in their relaxed position, with it being clear that they are placed elastically against the lateral region 5. Furthermore, the seal 6 has two sealing lips 12", 12''' which lie opposite each other in the region of a roof-frame side receptacle 13, seal the roof-frame side receptacle 13 and, when the side window 14 is closed, are placed against the inside and outside of the latter. During closing of the side window 14, the side window 14 penetrates the receptacle 13 with elastic bending of the two sealing lips 12", 12'''. In this case, the receptacle 13 is in each case of a U-shaped configuration in the section planes II-II and III-III.

According to FIG. 2 an extruded profile 15 which substantially forms the receptacle 13 is screwed onto an intermediate piece 16 of the first surface bow 9. The screw connection permits both a vertical displacement and a transverse displacement with respect to a screw axis 17, and therefore the extruded profile 15 can be aligned with respect to the intermediate piece 16. It is clear, in the case of the illustrations according to FIG. 2 and according to FIG. 3, that the seal 6 engages in a form-fitting manner around the extruded profile 15 which forms the roof-frame side receptacle 13 of the side window 14. In addition, the seal 6 can be connected to the extruded profile 15 via an undercut profile 18, for example a dovetail connection. It is also conceivable for the seal 6 to be adhesively bonded or welded to the extruded profile 15 or to be connected fixedly thereto in another manner.

In general, the seal 6 is preferably produced from a flexible plastic and from one piece together with the sealing lips 12 to 12'''. Furthermore, the seal 6 can have at least one chamber 19 which increases the elasticity thereof, is closed circumferentially and is configured to be outwardly open only on the end side of the seal 6. The chamber 19 of this type reduces the weight of the seal 6, which is of particular importance in the construction of sports cars, and, it weakens a cross section of the seal 6 in the region of the chamber 19, as a result of which the seal becomes more elastic in this region.

The lateral stiffened region 5 can have a metal core 20, for example a sheet-metal sheet, which brings about the stiffening. Furthermore, the stiffened lateral region 5 can be enclosed by an enclosing band 21 and can have an element 22 which forms a rain outlet. The element 22 protects a person getting in and out of the vehicle during rain from water running off directly from the top 1. By contrast, the enclosing band 21 surrounds the end side of the lateral region 5 and, as a result, makes the latter more robust. In addition, a weather strip 23 can be provided which, together with a cable element 24 clamped in the weather strip 23, reinforces the edge region of the covering 4. In principle, the weather strip 23 together with the cable element 24 guided therein permits sheet-like clamping of the covering 4 transversely with respect to the cable element 24.

What has been described in the previous paragraphs in accordance with FIG. 2 applies analogously to FIG. 3 with it being possible to see in FIG. 3 that the top linkage 3, i.e. the lateral roof frames 2, each contain a main link 25 and a roof link 26. The extruded profile 15 is preferably disposed on the roof link 26 or is connected thereto. According to FIG. 3, a sealing lip 12"" opposite the sealing lip 12''' is supported on the roof link 26 or bears against the latter.

By the top 1 according to the invention, it is possible to obtain a particularly good sealing action between the covering 4 and the lateral top linkage 3, which forms the roof frame 2, by the lateral regions 5 of the covering 4 being reinforced by the metal core or the sheet-metal sheet 20 and, as a result, being able to be pressed against the sealing lips 12, 12' of the top-linkage side seal 6 when the top 1 is closed better than is possible if the lateral edge regions are not reinforced.

The invention claimed is:

1. A top for a convertible which can be put away in a rear region of the convertible, the top comprising:

top linkages each forming a lateral roof frame, one of said top linkages disposed on each side of the convertible;

a flexible covering stretched open when the top is closed and covering at least parts of the top, said flexible covering having stiffened lateral regions facing said lateral roof frame; and a seal disposed between said stiffened lateral regions of said flexible covering and said lateral roof frame when the top is closed forming a stretched-open covering.

2. The top according to claim 1, further comprising clamping elements stretching open said flexible covering in a sheet-like manner and stiffening said flexible covering.

3. The top according to claim 2, wherein said clamping elements are four clamping elements stretching open said flexible covering in said sheet-like manner, a frontmost clamping element of said clamping elements in a direction of travel being an integral roof frame, said clamping elements disposed directly behind said frontmost clamping element are first and second surface bows, and a rearmost clamping element of said clamping elements in the direction of travel is a rear window frame with a rear window.

4. The top according to claim 1, wherein said seal has at least one sealing lip facing said stiffened lateral regions of said flexible covering.

5. The top according to claim 1, further comprising a U-shaped, roof-frame side receptacle in which a side window can engage when the top is closed; and wherein said seal has two opposite sealing lips which seal said U-shaped, roof-frame side receptacle, said two opposite sealing lips bearing against an inside and an outside of the side window when the top is closed and when the side window is closed.

6. The top according to claim 5, further comprising an extruded profile which forms said U-shaped, roof-frame side receptacle for the side window; and wherein said seal engages in a form-fitting manner around said extruded profile.

7. The top according to claim 1, wherein each said lateral roof frame contains a main link and a roof link.

8. The top according to claim 1, further comprising an element forming a rain outlet being disposed in each case laterally on said flexible covering.

9. The top according to claim 1, wherein said seal has at least one chamber which increases an elasticity of said seal.

10. The top according to claim 6, wherein said seal together with said sealing lips are produced as a single piece unit;

further comprising an undercut profile connecting said seal to said extruded profile; and wherein said seal is adhesively bonded or welded to said extruded profile.

11. The top according to claim 6, wherein said seal together with said sealing lips are produced as single piece unit.

12. The top according to claim 6, further comprising an undercut profile connecting said seal to said extruded profile.

13. The top according to claim 6, wherein said seal is adhesively bonded or welded to said extruded profile.

* * * * *